US009540849B2

(12) United States Patent
Renfro et al.

(10) Patent No.: US 9,540,849 B2
(45) Date of Patent: Jan. 10, 2017

(54) COMMERCIAL MOTOR VEHICLE AND HEAVY EQUIPMENT BATTERY LOCKING DEVICE AND SYSTEM FOR USE

(71) Applicants: Cecil W. Renfro, Richmond, KY (US); David A. Adkins, Richmond, KY (US)

(72) Inventors: Cecil W. Renfro, Richmond, KY (US); David A. Adkins, Richmond, KY (US)

( * ) Notice: Subject to any disclaimer, the term of this patent is extended or adjusted under 35 U.S.C. 154(b) by 0 days.

(21) Appl. No.: 14/499,077

(22) Filed: Sep. 26, 2014

(65) Prior Publication Data

US 2015/0089981 A1    Apr. 2, 2015

Related U.S. Application Data

(60) Provisional application No. 61/883,795, filed on Sep. 27, 2013.

(51) Int. Cl.
*E05B 73/00* (2006.01)
*B60R 16/04* (2006.01)
*H01M 2/10* (2006.01)

(52) U.S. Cl.
CPC .............. *E05B 73/00* (2013.01); *B60R 16/04* (2013.01); *H01M 2/1083* (2013.01); *Y10T 70/5566* (2015.04); *Y10T 70/5867* (2015.04)

(58) Field of Classification Search
CPC .. F16B 41/005; B62D 53/085; E05B 73/0076; E05B 73/00; F02B 61/045; B60R 25/00; B60R 16/04; H01M 2/1083; Y10T 70/5566; Y10T 70/5854; Y10T 70/5858; Y10T 70/5863; Y10T 70/5867

USPC ............ 70/232, 258, DIG. 57, 58, 229–231; 180/68.5; 248/551–553, 500, 503
See application file for complete search history.

(56) References Cited

U.S. PATENT DOCUMENTS

| | | | | |
|---|---|---|---|---|
| 1,577,292 A * | 3/1926 | Obreiter | ........................... | 70/258 |
| 1,912,872 A * | 6/1933 | Trautner et al. | ................. | 70/260 |
| 2,170,325 A * | 8/1939 | Harrison | ................. | B60R 16/04 180/68.5 |
| 2,326,481 A * | 8/1943 | Meyer | ................. | H01M 2/1083 180/68.5 |
| 2,500,375 A * | 3/1950 | Parker | ............................ | 70/232 |
| 2,710,660 A * | 6/1955 | Coleman | ............ | H01M 2/1083 180/68.5 |
| 2,791,898 A * | 5/1957 | Pegg et al. | ....................... | 70/230 |
| 2,800,601 A * | 7/1957 | Martin et al. | ................. | 362/396 |
| 2,994,395 A * | 8/1961 | Hall | ............... | 180/68.5 |
| 3,423,971 A * | 1/1969 | Brunelli | ........................... | 70/231 |
| 3,498,400 A * | 3/1970 | Hysmith | ...................... | 180/68.5 |

(Continued)

OTHER PUBLICATIONS

US Department of Transportation Federal Motor Carrier Safety Administration Regulations, Section 393.30, current through Jul. 16, 2013.

(Continued)

*Primary Examiner* — Lloyd Gall
(74) *Attorney, Agent, or Firm* — Catherine Jane Becker (57) ABSTRACT

The present invention relates to a commercial motor vehicle and heavy equipment battery locking device, methods of producing the same, and methods of utilizing the same. In particular, the present invention relates to a lockable device that covers the hold-down nut(s), hold-down bolt(s), and/or hold-down bracket(s) that secure a battery to a commercial motor vehicle or heavy equipment so that the battery cannot be stolen as well as a system for production and use.

18 Claims, 8 Drawing Sheets

(56) References Cited

U.S. PATENT DOCUMENTS

| | | | | |
|---|---|---|---|---|
| 3,752,254 A | * | 8/1973 | Carley et al. | 180/68.5 |
| 3,826,115 A | * | 7/1974 | Davis | 70/258 |
| 3,866,704 A | * | 2/1975 | Bowers et al. | 180/68.5 |
| 4,028,913 A | * | 6/1977 | Falk | 70/58 |
| 4,191,034 A | * | 3/1980 | Froess et al. | 70/258 |
| 4,249,403 A | * | 2/1981 | Littlejohn | 70/230 |
| 4,495,787 A | * | 1/1985 | Comstock | 70/258 |
| 4,535,863 A | * | 8/1985 | Becker | 180/68.5 |
| 4,884,420 A | * | 12/1989 | Finkel et al. | 70/58 |
| 5,027,627 A | * | 7/1991 | Derman | 70/164 |
| 5,052,198 A | * | 10/1991 | Watts | 70/58 |
| 5,547,160 A | * | 8/1996 | Johnson | 248/503 |
| 6,102,356 A | * | 8/2000 | Huntley et al. | 248/500 |
| 6,166,910 A | * | 12/2000 | Ronberg et al. | 361/724 |
| 6,827,169 B1 | * | 12/2004 | Van Hout et al. | 180/68.5 |
| 6,871,829 B2 | * | 3/2005 | Shannon, Jr. | 248/505 |
| 7,673,482 B2 | * | 3/2010 | Bosman | 70/232 |
| 7,698,916 B2 | | 4/2010 | Davis | |

OTHER PUBLICATIONS

Robert Berg, Jobsite Security on Commercial Construction Projects, Robert Berg (unpublished master of science theses, University of Florida, 2003).

* cited by examiner

COMMERCIAL MOTOR VEHICLE AND HEAVY EQUIPMENT BATTERY LOCKING DEVICE AND SYSTEM FOR USE

This application claims priority to U.S. Provisional Application No. 61/883,795, filed Sep. 27, 2013, which is hereby incorporated by reference in its entirety. Any and all applications for which a foreign or domestic priority claim is identified in the Application Data Sheet as filed with the present application are hereby incorporated by reference under 37 CFR 1.57.

REFERENCES CITED

Robert Berg, *Jobsite Security on Commercial Construction Projects*, Robert Berg (unpublished master of science theses. University of Florida, 2003).

§393.30 Battery installation. US Department of Transportation Federal Motor Carrier Safety Administration Regulations.

U.S. Pat. No. 7,698,916, April 2010, Davis.

BACKGROUND OF THE INVENTION

Commercial motor vehicles and heavy equipment require electric energy from one or more batteries to start the engine and operate. Unlike batteries used in private passenger automobiles, the batteries used to start and operate heavy equipment and commercial motor vehicles are located and housed outside of the engine compartment where they are usually covered by a fixed part of the motor vehicle or protected by a removable cover or enclosure that is securely latched or fastened to prevent shifting during use.[1] To prevent the batteries from shifting, (and/or to meet regulations, rules, guidelines and/or laws), the batteries are often secured in place by a hold-down bolt or bolts, a hold-down nut or nuts, and a hold-down bracket or brackets. The batteries for commercial motor vehicles and heavy equipment are relatively expensive, often costing between $150.00 and $600.00 each, and often requiring multiple batteries to operate a single vehicle or equipment. Since the batteries are located outside of the engine compartment, are relatively easy to access, and are relatively valuable, they are often a target for thieves. Theft of batteries from commercial motor vehicles and heavy equipment has become an increasing problem with both direct costs (i.e., replacement cost) and indirect costs (i.e., decreased efficiency and productivity of employees, vehicles, and/or equipment, potential losses of bonuses and/or imposition of penalties, potential loss of goodwill and/or future work/jobs). In sum, theft of commercial motor vehicle and heavy equipment batteries is a problem that negatively affects productivity and profitability.[2] This problem affects both private industry and government and the financial burden is often passed along to customers and taxpayers in the form of higher prices. It is a cost directly or indirectly felt by most everyone, albeit at different levels of severity.

[1] §393.30 Battery installation. US Department of Transportation Federal Motor Carrier Safety Administration Regulations.
[2] Robert Berg. *Jobsite Security on Commercial Construction Projects*, Robert Berg (unpublished Master of Science theses, p. 11-12, University of Florida, 2003).

DESCRIPTION OF THE RELATED ART

Current methods imposed to deter theft of commercial motor vehicle and heavy equipment batteries include the following: removal of batteries from vehicle or equipment when not in use; marking or engraving of batteries with wording and/or symbols; using specialty nuts rather than standard nuts on the battery hold-down apparatus; implementing an alarm system, using pad lock(s) alone or in conjunction with a bar to prevent a thief from accessing the battery housing. For reasons described in more detail below, none of the current methods of deterring theft of commercial motor vehicle and heavy equipment batteries is very effective.

The removal of batteries from a vehicle or equipment when not in use would certainly render theft impossible, however, it may not always be possible or practicable for the batteries to be removed, especially far short breaks in usage (e.g., semi-truck driver stopping to eat at a restaurant). Also, removal of the batteries requires additional storage space (which a driver may not have when away from home-base) as well as time to uninstall and later reinstall the batteries.

The marking or engraving of wording and/or symbols is not an effective method for deferring theft of commercial motor vehicle and heavy equipment batteries. Although a marking or an engraving of words and/or symbols may identify the original owner of a stolen battery, such marking or engraving could be easily scratched out or otherwise removed by a thief before attempting to resell the stolen battery, or never discovered by anyone other than the thief (e.g. thief uses battery themselves and/or resells only a component of the battery that does not include the engraving). Further, the battery with a marking or engraving identifying the rightful owner may never be discovered and therefore the battery never returned to the rightful owner. Additionally, marking or engraving the battery could cause damage to the battery.

Specialty nuts that require specialty sockets to install and uninstall can be used in place of standard nuts to secure the battery to the vehicle or equipment. A thief that encounters specialty nuts when attempting to steal a battery may have a specialty socket, vise grips, or another hand tool that could be used to remove the specialty nut. If the thief does not have a tool to remove the specialty nut when initially encountering it, the thief may only delay the theft until returning with a specialty socket or another devise that could remove the specialty nut. Specialty nuts may deter some theft, but they are not effective against a knowledgeable and determined thief.

Alarm systems can be installed in commercial motor vehicles and heavy equipment such that an alarm is triggered when an attempt to disconnect the battery is made. Alarm systems are expensive, can produce false alarms, and require a separate battery. A knowledgeable and determined thief could disable the battery to the alarm system before stealing the batteries on the vehicle or equipment rendering the alarm useless. Further, even if the alarm is triggered, it may not be heard or responded to by others before the theft of the batteries takes place.

The batteries on commercial motor vehicles and heavy equipment are often located below steps that lead to a cab compartment or in a host with a removable lid. Either alone, or in conjunction with a bar, a lock (e.g., pad lock, cam lock, etc.) can be used to secure the steps in place and/or the lid to the box in an effort to completely prevent a thief from accessing the batteries. Pad locks, bars, and other devices used outside of the steps and/or box can often be removed by a knowledgeable and determined thief (e.g., with bolt cutters). If bolt cutters are not sufficient, the thief may use a torch (e.g., welding torch) or other cutting device to remove the locks and/or bars without fear of causing a battery explosion as the batteries have not yet been accessed and are therefore not exposed. Further, pad locks, bars, and other devices that prevent emergency workers from accessing the battery cables in the event of an emergency may violate national, state, and/or local transportation regulations implemented on commercial motor vehicles and heavy equipment.

The currently available devices and systems for deterring theft of commercial motor vehicle and heavy equipment batteries have limited effect at best. Further, owners and operators or commercial motor vehicles and heavy equipment may be limited by legal regulations, company rules of not altering company equipment, company security guidelines, and the tight spaces in and around the battery and battery housing units in which to install security equipment. Thus, there exists a need for a device and system for effectively deterring theft of commercial motor vehicle and heavy equipment batteries.

SUMMARY OF THE INVENTION

The present disclosed invention relates to a commercial motor vehicle and heavy equipment battery locking device, methods of producing the same, and methods of utilizing the same. Compositions and methods of the invention find use as a theft deterrent in a variety of commercial motor vehicles and heavy equipment. However, the disclosure may also extend beyond commercial application. The present invention makes it very difficult, if not impossible, to remove the battery or batteries from a commercial motor vehicle(s) or heavy equipment by preventing the hold-down bolt(s), hold-down nut(s) and hold-down bracket(s) from being accessed and removed, altered, or damaged.

Accordingly, in some embodiments the invention provides a cover plate that covers the battery hold-down nuts with a lock on one or both sides of the cover plate that secures the cover plate to the battery hold-down bracket when secured and locked in place. In some embodiments, the invention may include a cover, sheath, or sleeve that is placed over exposed bolts before the cover plate is secured over the hold-down bracket covering hold-down nuts. In some embodiments, the invention may include a bracket or device that can be inserted under the battery hold-down bracket extending beyond the length of the battery hold-down bracket on either one or both sides ("extension bracket"). The insertion of an extension bracket, when needed, provides a place for the locking mechanism of the cover plate lock to latch and therefore lock in place when the hold-down bracket is not long enough to provide a place for the lock to latch. In some embodiments of the disclosed invention, a bracket is inserted under the hold-down bracket before the cover plate is secured into place ("support bracket"). The insertion of a support bracket, when needed, changes the positioning of the hold-down bracket such that the cover plate can be secured and locked into place. In a preferred embodiment, the disclosed cover plate is made primarily of steel. However, the disclosure of the invention is not limited to the material the cover plate is made of; in some embodiments, the covet plate may be made of any kind of metal or plastic and may include a coating on the metal. In a preferred embodiment, the invention provides a cylinder lock affixed to the side of the cover plate such that the key must be positioned parallel to the cover plate when inserted into the key hole rendering the lock somewhat hidden from immediate viewing, especially when the lock is in the locked position. However, the present invention is not limned by the type of lock, nor the placement of the lock. In some embodiments, any kind of lock is positioned anywhere on the cover plate.

The placement and location of batteries in commercial motor vehicles and heavy equipment often differ depending on the make and/or model. In some embodiments, the cover plate may be flat while in some embodiments, the invention may have a curved, or even an "L" shaped cover plate. In a preferred embodiment, the cover plate will be a shape that corresponds with the shape and location of the hold-down bracket(s), hold-down nut(s), and hold-down bolt(s) to ensure a tight fit for the cover plate that can smoothly lock into place over the hold-down bracket covering the hold-down nuts. In some embodiments the position of the holes on the cover plate may differ, especially to correspond with the location of the hold-down bolt(s) and hold-down nut(s) that the invention intends to cover. In some embodiments a portion of the hold-down bolt located beyond the hold-down nut may be exposed when the cover plate is in the secured and locked position. Further, in some embodiments the invention may include one single plate to lock in place over the hold-down bracket covering the hold-down nuts while in other embodiments the invention may include two, three, or four cover plates that lock in place over the hold-down bracket covering the hold-down nuts. In some embodiments, the cover plate may be as short as six (6) inches in length and in some embodiments, the cover plate may be as long as seven (7) feet, and in other embodiments the cover plate may range in length between six (6) inches and seven (7) feet. In some embodiments, the cover plate is made by being stamped; in other embodiments the cover plate is made by being die cut; in other embodiments the cover plate is made by being forged, cut, welded, milled/ground. In some embodiments, the cover plate(s) may cover the entire battery or batteries and housing as well as the hold-down nut(s). In a preferred embodiment, the cover plate(s) completely cover the hold-down nut(s) and hold-down bracket(s) but leave the battery wires exposed in the event that access to the battery wires is needed in an emergency (e.g., in the event of an accident, in which the battery lines need to be cut for safety) or required (e.g. required by law or regulation).

DEFINITIONS

A "battery" is a device that produces and stores electrical energy as a result of a chemical reaction. As used herein the term "battery" refers to: the battery (or batteries) that supplies (supply) electric energy to a commercial motor vehicle and/or heavy equipment. Types of batteries include, but are not limited to, the following: Group 31, Group 31A, Group 31C, Group 4D, Group 4DLT, Group 6D, Group 8D, Group V1, Group 22NF, Group 24, Group 27, Group 28, Group 29H, and Group 30H.

As used herein the term "commercial motor vehicle" refers to any type of motorized road vehicle that by its type of construction and equipment is designed for and capable of transporting, whether for payment or not, more than nine (9) passengers including the driver, and or goods. Types of commercial vehicles include, but are not limited to, the following: box trucks, semi-trucks, tractor trailers, vans, coaches, buses, recreational vehicles ("R.V.'s"), motor homes, fifth wheels, and travel trailers.

As used herein the term "heavy equipment" refers to heavy-duty vehicles, specially designed for executing construction and farming tasks. Also known as, "heavy machines," "heavy trucks," "construction equipment," "engineering equipment," "heavy vehicles," "heavy hydraulics," "farm equipment," and or "agricultural machinery" types of heavy equipment include, but are not limited to the following: agricultural tractors, air-tracks, bulldozers, snow-cats, track skidders, track-type tractors (bulldozer), tractors, military engineering vehicles, graders, skid steer leaders, compact excavators, dragline excavators, dredging excavators, excavators (wheel), excavators (bagger, digger), front shovels, reclaimers, steam shovels, suction excavators, trenchers (machine), yarders, backhoes, backhoe loaders, feller bunchers, harvesters, skidders, track harvesters, wheel forwarders, wheel skidders, pipelayers, fresno scrapers, scrapers, wheel tractor-scraper, construction and mining tractors, constructing and mining trucks, articulated haulers, articulated trucks, water wagons, wheel dozers, soil compactors, soil stabilizers, loaders, skip loaders (skippy), wheel loaders (front loaders, integrated tool carriers), track loaders, aerial work platforms, lift tables, boomtrucks, cherry pickers, cranes, forklifts, knuckleboom loaders (trailer mount), reach stackers, telescopic handlers, asphalt pavers, asphalt plants, cold planner, concrete batch plant, cure rigs, pavers, pneumatic tire compactors, road rollers, roller compactors, slipform pavers, vibratory compactors, compactors, stumpers, concrete drop hammer, roadheader, tunnel boring machines, underground mining equipment, ballast tampers, attachments, drilling machines, pile drivers, rotary tillers venture-mixers, dump tracks, highway 10 yard rear dumps, highway bottom dumps (stiff), pups (belly train), triples, highway end dumps, side dumps, highway transfers, transfer trains, highway transit-mixers, lowboy trailers, street sweepers, cultivators, multi packers, chisel plows, harrows, plows, subsoilers, rotators, rollers, strip tills, broadcast seeder, planter, plastic mulch layer, potato planters, seed drills, air seeders, precision drills, transplanters, fertilizer spreaders, terragators, liquid manure/slurry spreaders, manure spreader, sprayers, slurry agitators, irrigators, produce sorters, balers, beet cleaner loaders, harvesters (including but not limited to beet harvesters, bean harvesters, cane harvesters, carrot harvesters, combine harvesters, corn harvester, forage harvesters, silage harvester, grape harvester, over-the-row mechanical harvester, apple harvester, potato harvester, sugarcane harvester), chaser bins, conveyors, cotton pickers, grain cradles, farming mills, flails, gleaners, grain cleaners, grain driers, gravity wagons, baulum toppers, haulout transporters, mowers, potato spinner/diggers, reapers, reaper-binders, rice hullers, strippers, swathers, threshers, tractors, tree shakers, bale movers, bale mangers, balers, conditioners, bale lifters, toppers, loader wagons, backhoes, front end loaders, skid-steer loaders, post drivers, hedge cutters, mulching machines.

As used herein the term "hold-down bracket" (also referred to as a "hold-down plate" or "battery hold-down bracket" or "factory hold-down bracket") refers to the hold-down bracket that secures a battery or batteries to the housing. Most often hold-down bracket(s) are produced by the commercial motor vehicle or heavy equipment manufacturer.

As used herein the term "hold-down bolt" (also referred to as a "battery hold-down bolt" or "factory hold-down bolt") refers to the hold-down bolt or bolts that a hold-down bracket is placed over in order to secure a battery or batteries to the housing. Most often hold-down bolts(s) are produced by the commercial motor vehicle or heavy equipment manufacturer. Hold-down bolts may be exposed (in whole or in part) or not, depending on the manufacturer, make, and model of the commercial motor vehicle or heavy equipment.

As used herein the term "hold-down nut" (also referred to as a "battery hold-down nut" or "factory hold-down nut") refers to the hold-down nut that secures a hold-down bracket to a hold-down bolt in order to secure the battery or batteries to or within the housing. Most often hold-down nuts(s) are produced by the commercial motor vehicle or heavy equipment manufacturer.

As used herein the term "L-shape" refers to the shape that resembles the capital letter "L".

As used herein the term "lock" refers to a mechanical or electronic fastening device that is released by a physical object (such as a key, keycard, fingerprint, RFID card, or security token) by supplying secret information (such as a keycode or password), or by a combination thereof. Types of locks include, but are not limited to the following: abloy lock, bicycle lock, cam lock, chamber lock, child safety lock, combination lock, cylinder lock, cylinder sliding lock, deadbolt, disc tumbler lock, electronic lock, electric strike, magnetic lock, mortise lock, key card lock, lever tumbler lock, chubb detector lock, pad lock, pin tumbler lock, protector lock, luggage lock, magnetic keyed lock, padlock, RFID, rim lock, sliding door lock, time lock, tubular lock, wafer tumbler lock, warded lock. An example of a "lock" includes that of U.S. Pat. No. 7,698,916, April 2010, Davis which is hereby incorporated by reference in its entirety.

As used herein the term "metal" refers to a solid material that is typically hard, opaque, shiny, and features good electrical and thermal conductivity including, but not limited to base metal, ferrous metal, non-ferrous metal, noble metal, precious metal and alloy.

As used herein the term "plastic" refers to a synthetic or semi-synthetic organic solid drat is moldable. Plastics are typically organic polymers of high molecular mass, but they often contain other substances. Plastics are usually synthetic, most commonly derived from petrochemicals, but many are partially natural.

As used herein the term "cover plate" refers to the plate that is configured to cover one or more hold-down nuts when secured and locked into place. A cover plate may be L-shaped, flat, or other shapes.

As used herein the team "support bracket" refers to a bracket that is placed either under or over the hold-down bracket, but below the cover plate.

As used herein the term "cover" and/or "sheath" refers to a protective covering; something that is put around another thing (e.g., a hold-down bolt) to protect or hide it.

DETAILED DESCRIPTION OF THE PREFERRED EMBODIMENT

The batteries needed to power commercial motor vehicles and heavy equipment are often a target for thieves. Theft of commercial motor vehicle and heavy equipment batteries is costly, both in terms of direct cost born by owners and operators as well as indirect costs passed along to consumers, insurers, and taxpayers. The present disclosure relates to a commercial motor vehicle and heavy equipment battery locking device, methods of producing the same, and methods of utilizing the same. The invention disclosed herein makes it very difficult if not impossible for a thief to remove the battery or batteries [99] from a commercial motor vehicle and/or heavy equipment by preventing the hold-down bolt(s) [101], hold-down nut(s) [102], and hold-down bracket(s) [103] from being accessed, damaged, and/or removed.

Figure 11:
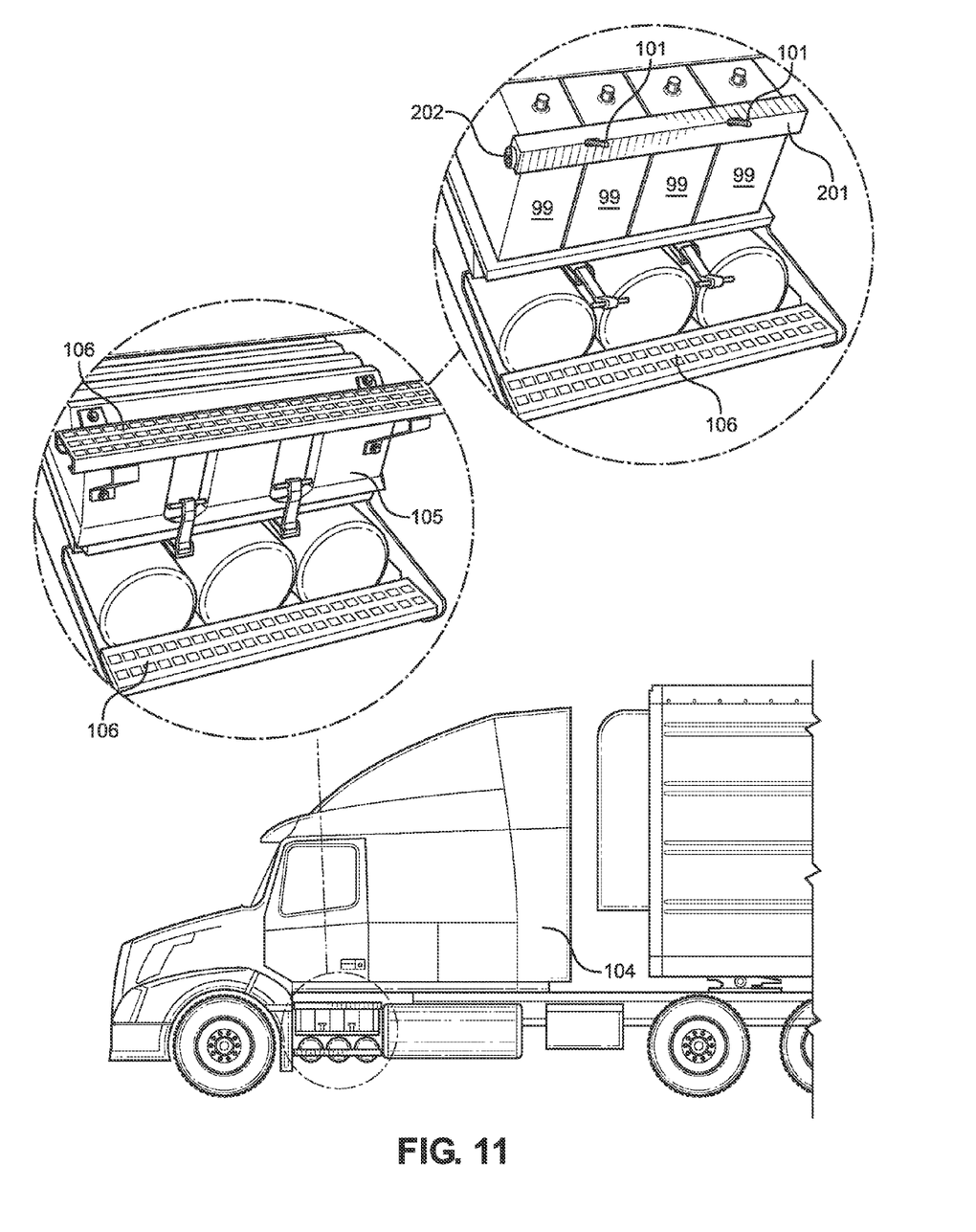
FIG. 11 is a side view of a truck with two windows showing (1) an enlarged perspective view of the battery housing external cover in place over the batteries and (2) an enlarged perspective view of the batteries and the cover plate in secured and locked position over the hold-down bracket covering hold-down nuts.

The placement and location of batteries [99] in commercial motor vehicles and heavy equipment often differ depending on the make and/or model of the vehicle or equipment. However, the batteries [99] in most commercial motor vehicles and heavy equipment are secured within a housing consisting of hold-down bolt(s) [101], hold-down nut(s) [102], and hold-down bracket(s) [103]. Also, the size and number of hold-down bolt(s) [101], hold-down nut(s) [102], and hold-down bracket(s) [103] often differ in terms of placement, location, and spacing in commercial motor vehicles and heavy equipment. In some commercial motor vehicles (e.g. semi-truck [104]) the battery or batteries [99] are located below an external cover [105]. In some semi-trucks (e.g. some Volvo brand model semi-trucks) the batteries [99] are located below an external cover [105] which is located below the steps [106] leading to the cab compartment of the truck [104]. Further, some commercial motor vehicle and heavy equipment battery housings have hold-down bolt(s) [101] that are exposed and some have hold-down bolt(s) [101] that are not exposed (e.g., not accessible below the hold-down nut(s) [102] without removing the hold-down nut(s) [102] and bracket(s) [103]).

Figure 9:
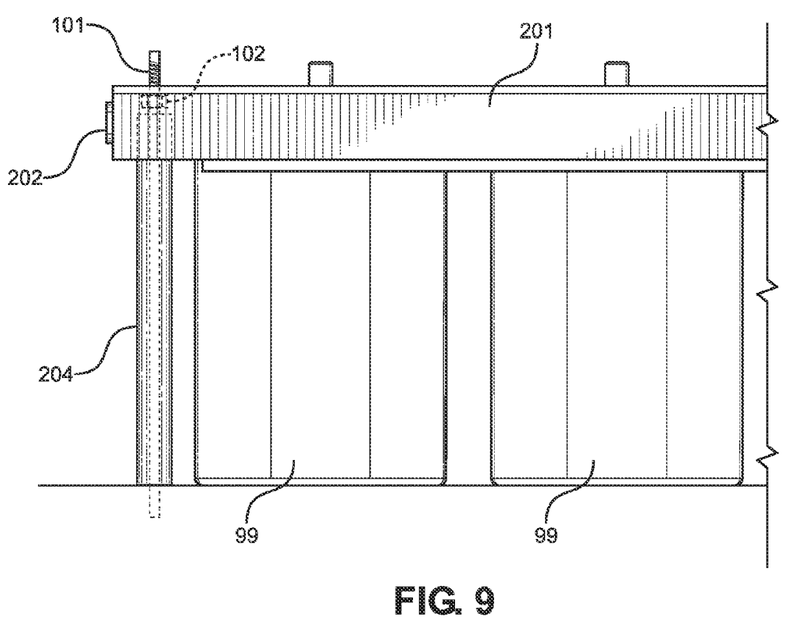
FIG. 9 is a fragmental front view of a cover plate in secured and locked position over hold-down bracket covering hold-down nuts that includes a sheath covering exposed hold-down bolt.
Figure 10A:
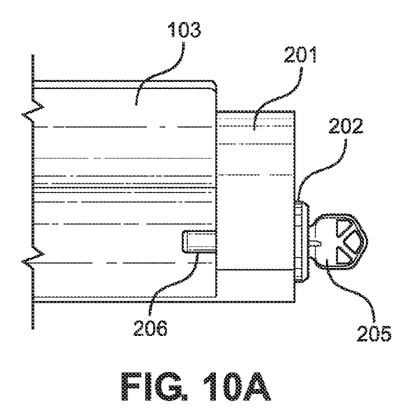
FIG. 10A is a fragmental bottom view of the cover plate in secured and locked position over hold-down bracket covering exposed hold-down nuts.
Figure 10B:
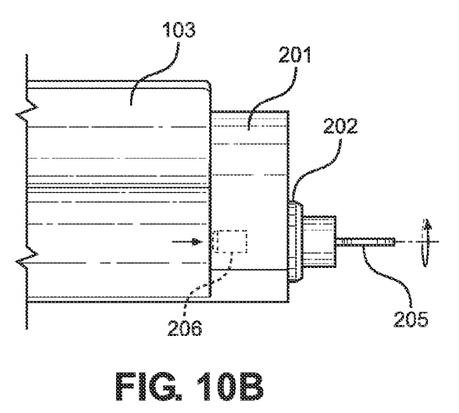
FIG. 10B is a fragmental under side view of the cover plate in secured but unlocked position over hold-down bracket covering the hold-down nuts.

The present disclosure provides a cover plate(s) [201] that cover(s) the hold-down nut(s) [102] with a lock [202] on one or more sides of the cover plate [201] that locks the cover plate(s) [201] to the battery hold-down bracket(s) [103] when secured and locked into place. In some embodiments, the disclosed invention may include a sheath [204] (which could also be termed a sleeve or cover) that is placed over exposed hold-down bolt(s) [101] before the cover plate [201] is positioned and locked over the hold-down bracket [103] covering the hold-down nuts [102]. In some embodiments, the disclosed invention may include a bracket or device that can be inserted under the hold-down bracket [103] extending beyond the length of the battery hold-down bracket [103] on either one or both sides ("extension bracket"). The insertion of an extension bracket, when needed, provides a place for the lock [202] to latch and therefore lock the cover plate [201] in place when the hold-down bracket [103] is not long enough.

Figure 1:
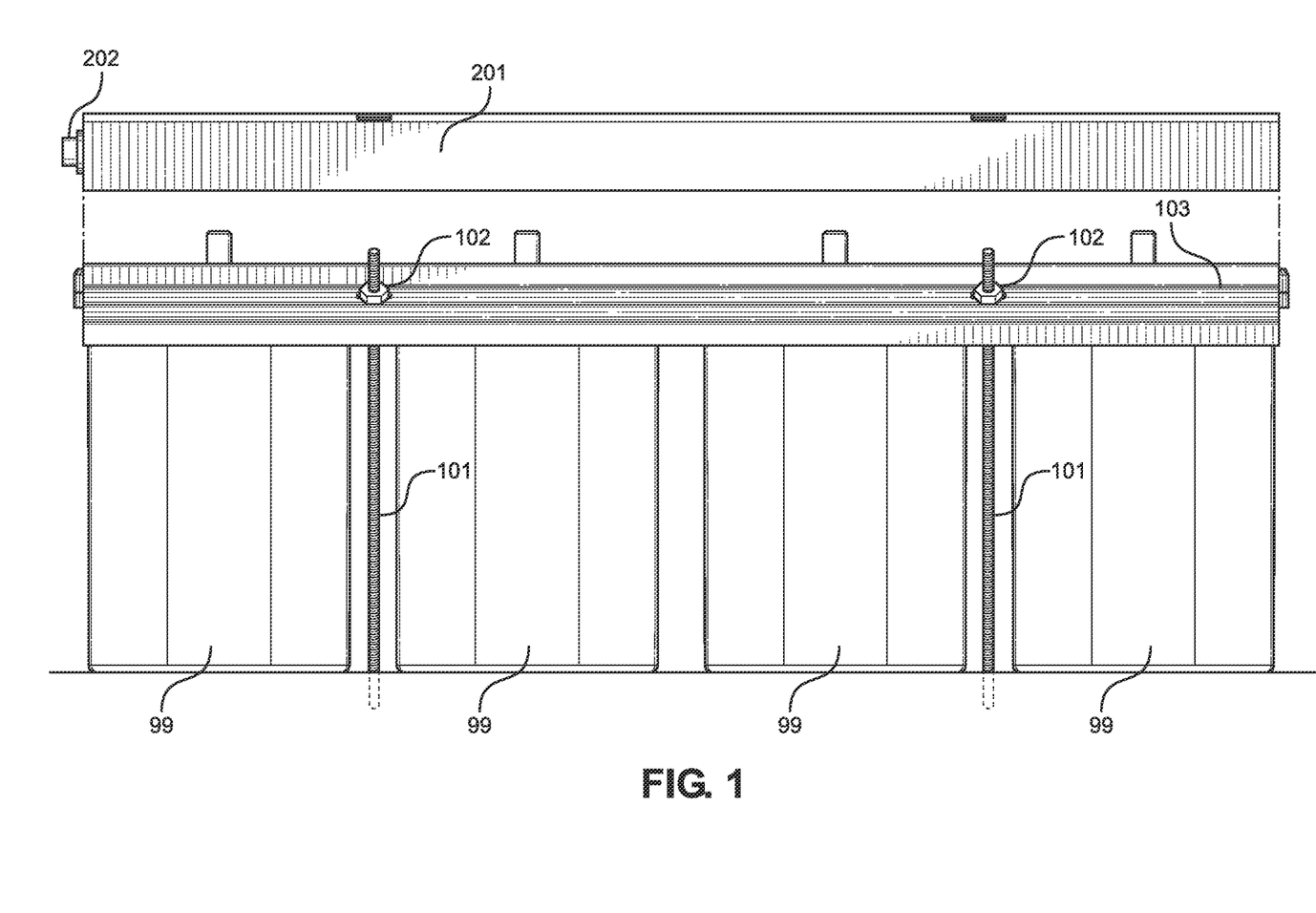
FIG. 1 is a front view of a cover plate in unsecured and unlocked position hovering above batteries, a hold-down plate, hold-down bolts, and hold-down nuts.
Figure 2:
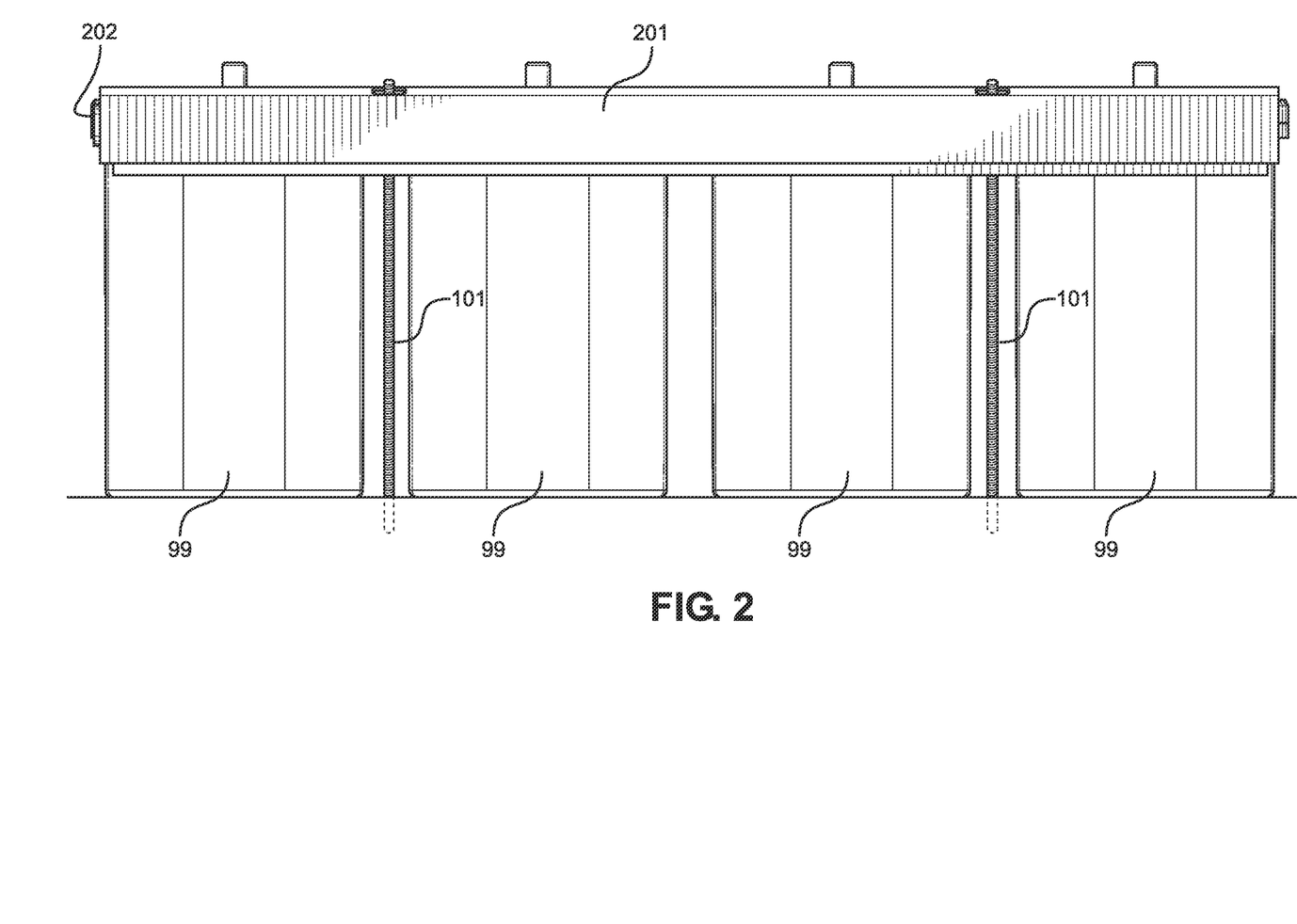
FIG. 2 is a front view of a cover plate in secured and locked position over hold-down bracket covering hold-down nuts.
Figure 3:
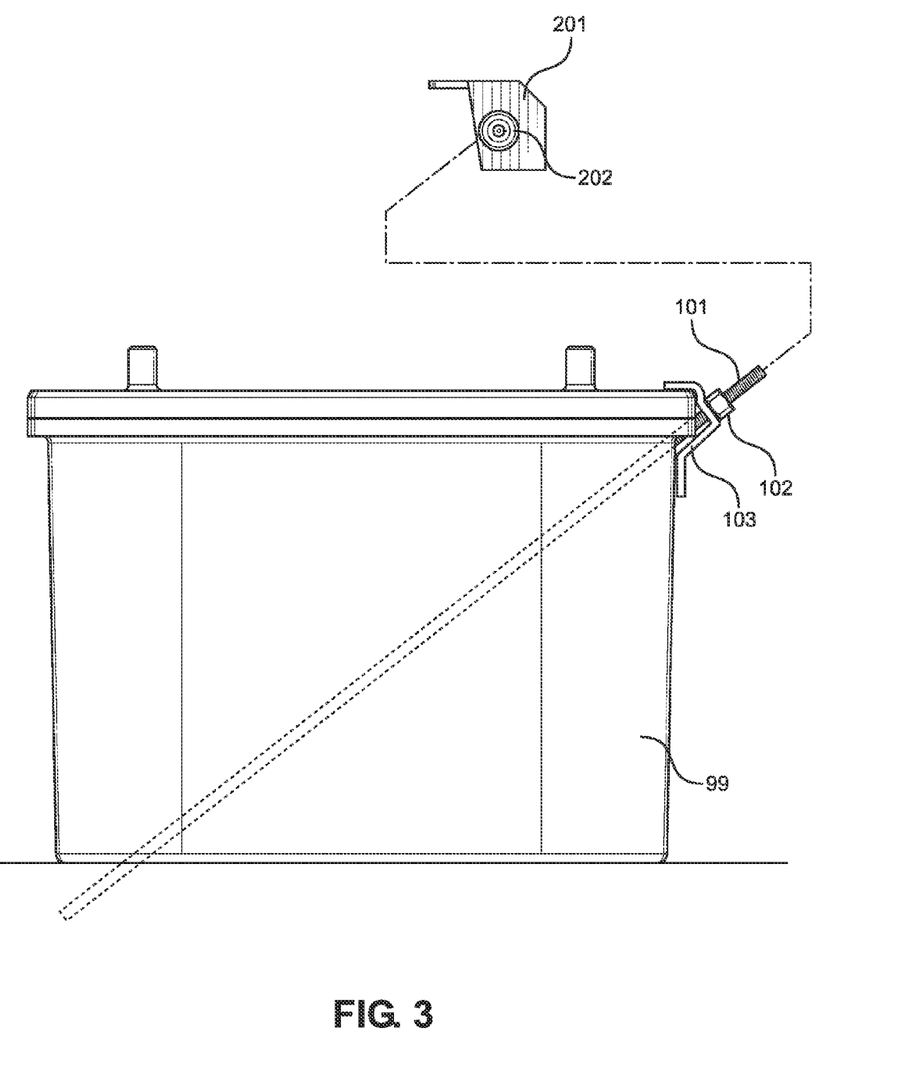
FIG. 3 is a side view of a cover plate in unsecured and unlocked position hovering above commercial motor vehicle and/or heavy equipment batteries, a hold-down bracket, hold-down bolts, and hold-down nuts.
Figure 4:
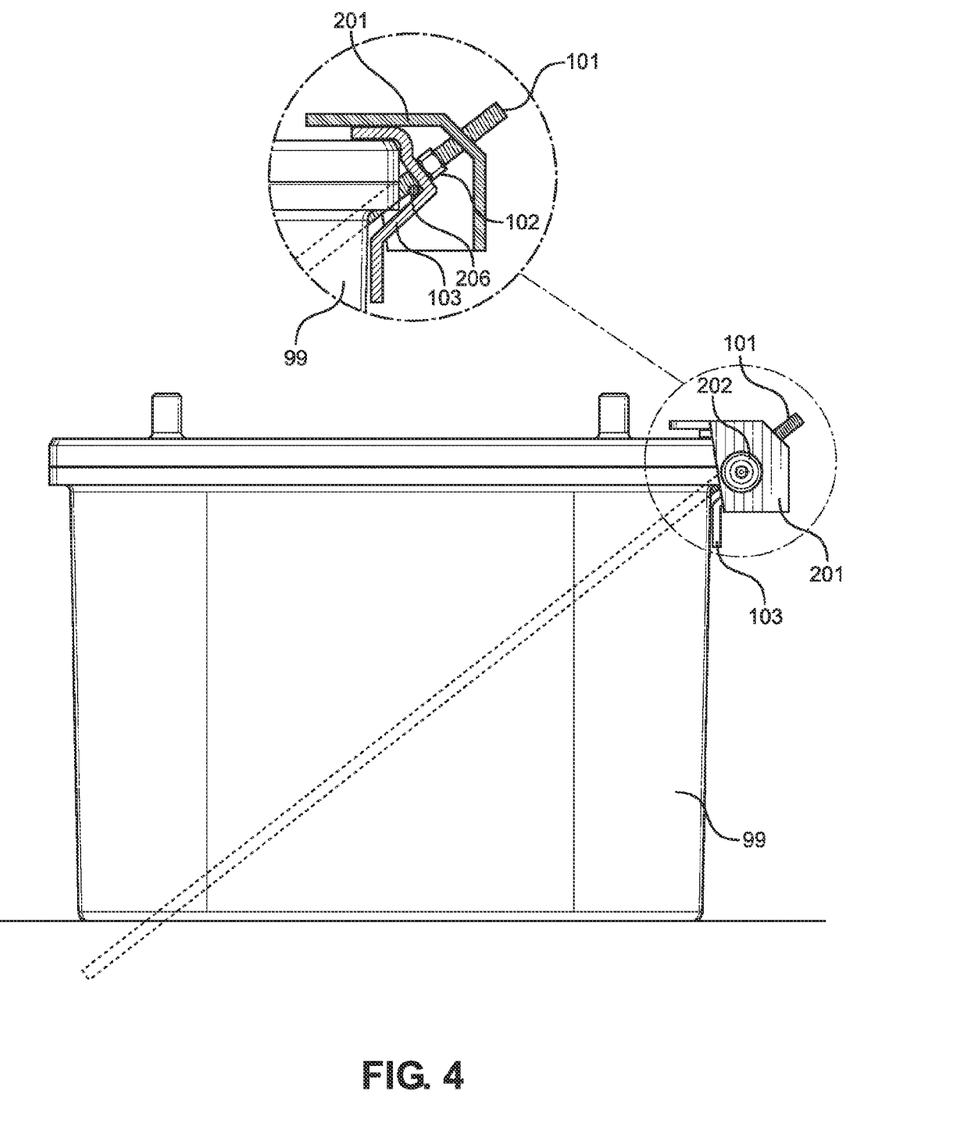
FIG. 4 is a side view of a cover plate in secured and locked position over hold-down bracket covering hold-down nuts and a window snowing an enlarged cross-sectional view.
Figure 5:
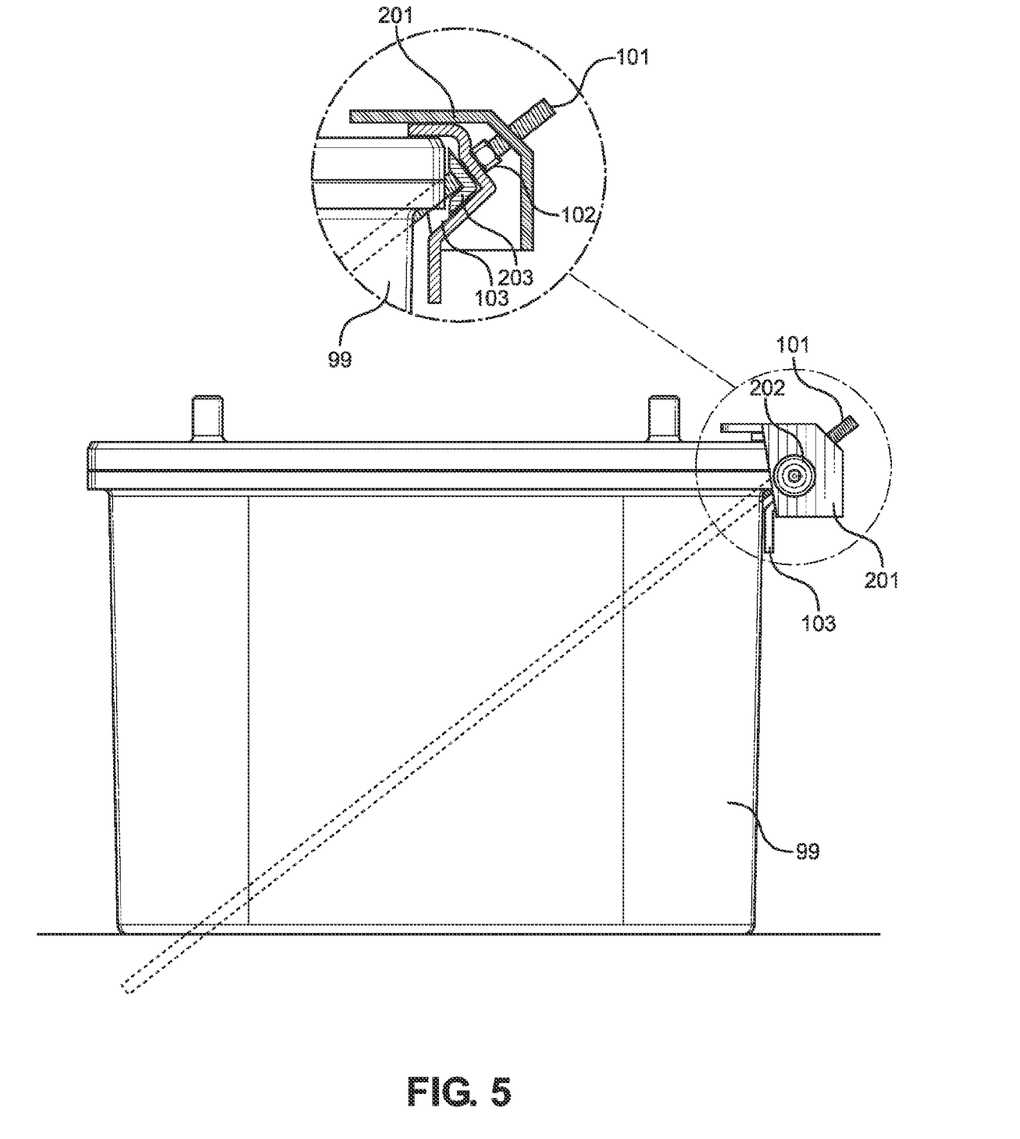
FIG. 5 is a side view of a cover plate in secured and locked position over hold-down bracket covering hold-down nuts with a window showing an enlarged cross-sectional view that includes support bracket.

In some embodiments a support bracket [203] is inserted below the battery hold-down bracket [103] before the cover plate is secured into place. The insertion of a support bracket [203], when needed, changes the positioning of the battery hold-down bracket [103] such that the cover plate(s) [201] can be secured and locked in place over the hold-down bracket(s) [103], covering the hold-down nut(s) [102]. In a preferred embodiment, the cover plate [103] is made primarily of steel. However, the disclosure is not limited to the material the cover plate [103] is made of; in some embodiments, the cover plate [103] may be made of any kind of metal or plastic and/or may include a coating on the metal.

Figure 6:
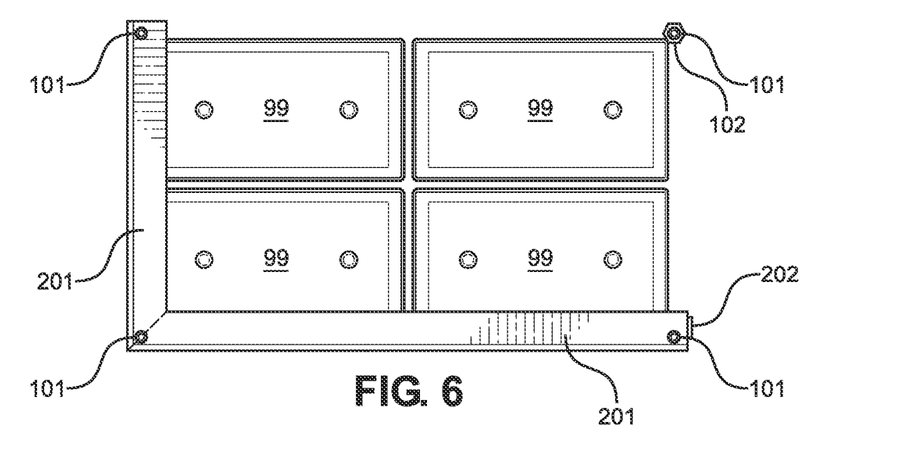
FIG. 6 is a birds-eye view of two cover plates in secured and locked position covering exposed hold-down nuts.
Figure 7:
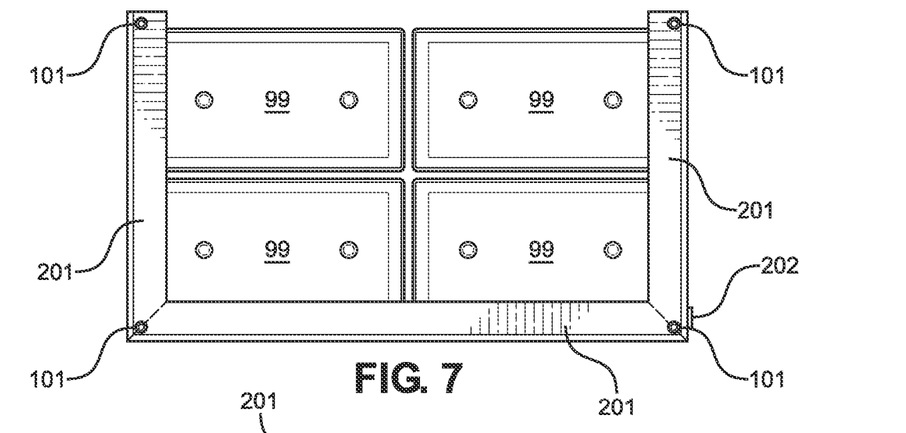
FIG. 7 is a birds-eye view of three cover plates in secured and locked position covering exposed hold-down nuts.
Figure 8:
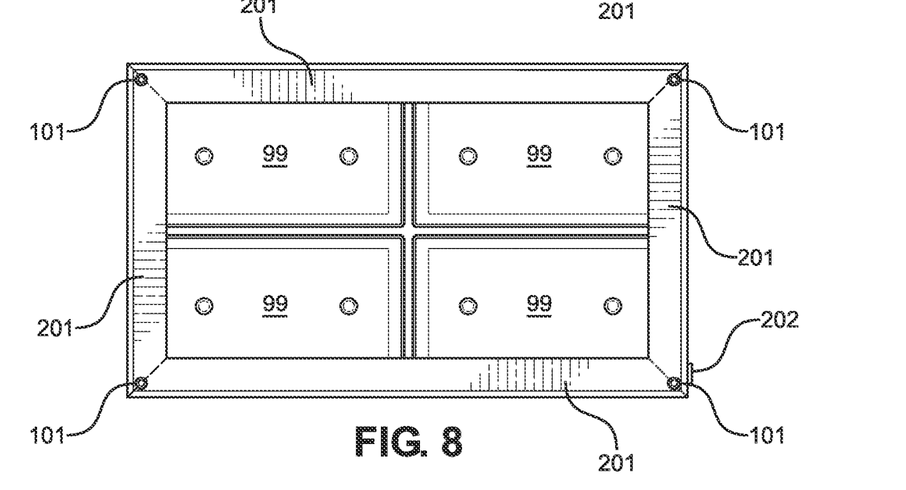
FIG. 8 is a birds-eye view of four cover plates in secured and locked position covering exposed hold-down nuts.

The disclosure provides a lock [202] that locks the cover plate(s) [201] to the hold-down bracket [103] completely covering the hold-down nut(s) [102] rendering them inaccessible. A preferred embodiment provides a cylinder lock affixed to one or both sides of the cover plate [201] wherein the pin component of the lock [206] extends underneath the hold-down bracket [103] to lock the cover plate [201] in place. In a preferred embodiment, the disclosure provides a cylinder lock on the side of the plate such that the key [205] must be positioned parallel to the cover plate [201] when inserted into the key hole rendering the lock [202] hidden or somewhat hidden from immediate viewing, especially when the lock [202] is in the locked position. However, the disclosure is not limited by the type of lock [202], nor the placement of the lock [202]. In some embodiments, the disclosure provides any kind of lock [202] positioned anywhere on the cover plate(s) [201]. The placement and location of batteries [99] in commercial motor vehicles and heavy equipment often differ depending on the make and/or model of the vehicle or equipment. In some embodiments, the disclosure may have a flat cover plate [201] while in some embodiments, the cover plate [201] may be curved, square, rounded, "U" shaped, or "L" shaped. In a preferred embodiment, the cover plate [201] will be a shape that corresponds with the shape of the hold-down bracket [103] to ensure a tight fit for the cover plate [201] over the hold-down bracket(s) [103] and hold-down nut(s) [102]. In some embodiments the position of the holes on the cover plate(s) [201] may differ, especially to correspond with the location of the hold-down bolt(s) [101] and hold-down nut(s) [102]. Further, in some embodiments the disclosure may include one single cover plate [201] to lock in place over the hold-down nut(s) [102] while in other embodiments the invention may include two [FIG. 6], three [FIG. 7], or four [FIG. 8] cover plates [201] that lock in place over the hold-down bracket(s) [103] covering the hold-down nut(s) [102].

In some embodiments, the cover plate(s) [201] may be as short as six (6) inches in length and in some embodiments, the cover plate(s) [201] may be as long as seven (7) feet, and in other embodiments the cover plate(s) [201] may range in length between six (6) inches and seven (7) feet.

In some embodiments, the cover plate(s) [201] is (are) made by being stamped; in other embodiments the cover plane(s) [201] is (are) made by being die cut; in other embodiments the cover plate(s) [201] is (are) made by being forged, cut, welded, milled/ground. In some embodiments, the cover plate(s) [201] may cover the entire battery [99] and hold-down bracket [103] as well as the hold-down nut(s) [102].

In a preferred embodiment, the cover plate(s) [201] completely cover(s) the hold-down nut(s) [102] and leaving the batten wires exposed and accessible. Exposure and accessibility of the battery wires may be helpful, needed, and/or required for maintenance purposes, government or other regulatory purposes, and/or in the event that emergency crews need access (e.g., in the event of an accident in which the battery lines need to be cut for safety) to the battery wires.

What is claimed is:

1. A system for securing a vehicle battery, comprising:
 a vehicle battery for providing electricity to a vehicle, wherein the vehicle battery includes a plurality of surfaces, including a top surface and a bottom surface, wherein the top surface is opposite the bottom surface and wherein the top surface and bottom surface define a height of the vehicle battery and wherein the top surface and the bottom surface have a common length;
 a housing for removably receiving the vehicle battery, wherein the housing includes at least the following:
  an upper portion;
  a lower portion for receiving the bottom surface of the vehicle battery, such that the vehicle battery rests on the lower portion;
  a hold down bracket that extends the common length of the vehicle battery and is in physical contact with the top surface;
  a hold down bolt that extends from the lower portion of the housing to the upper portion of the housing, wherein the hold down bolt engages with the housing and the hold down bracket; and
  a hold down nut that engages with the hold down bolt to removably secure the vehicle battery to the housing; and
 a locking device for locking to the housing, wherein the locking device includes a first cover plate that extends substantially across the hold down bracket and covers the hold down nut to prevent access to the hold down nut, thereby preventing removal of the vehicle battery when the locking device is engaged, wherein the locking device further comprises a lock that includes a pin component that, when engaged, extends from the locking device to engage with the hold down bracket to prevent removal of the locking device from the hold down bracket and when disengaged, retracts from the hold down bracket to allow removal from the hold down bracket.

2. The system of claim 1, further comprising an extension bracket for engaging with the locking device.

3. The system of claim 1, wherein the locking device is at least one of the following: substantially L-shaped, substantially U-shaped, substantially curved, substantially square, and substantially rounded.

4. The system of claim 1, wherein the locking device further comprises a second cover plate for securing a different portion of the vehicle battery.

5. The system of claim 1, further comprising:
 a first lock that is integral to the locking device and disposed on a first end of the locking device; and
 a second lock that is integral to the locking device and disposed on a second end of the locking device.

6. The system of claim 1, further comprising a sheath that is placed over the hold down bolt.

7. A locking device for securing a vehicle battery, comprising:
 a first cover plate configured to extend substantially across a length of a vehicle battery and overlying a hold down bracket, wherein the hold down bracket engages with a hold down bolt and a hold down nut to removably secure a vehicle battery in a housing, wherein the first cover plate covers the hold down nut to prevent access to the hold down nut, thereby preventing removal of the vehicle battery when the locking device is engaged; and
 a first lock that includes a pin component that, when engaged, extends from the lock to engage with the hold down bracket to prevent removal of the cover plate from the hold down bracket and when disengaged, retracts towards the lock and of the cover plate to allow removal from the hold down bracket.

8. The locking device of claim 7, further comprising an extension bracket for engaging with the locking device.

9. The cover plate of claim 7, wherein the locking device is at least one of the following: substantially L-shaped, substantially U-shaped, substantially curved, substantially square, and substantially rounded.

10. The locking device of claim 7, further comprising a second cover plate for securing a different portion of the vehicle battery.

11. The locking device of claim 7, further comprising a second lock that is integral to the cover plate and disposed on a second end of the cover plate.

12. The locking device of claim 7, wherein the hold down bolt is covered with a sheath.

13. A system for securing a vehicle battery, comprising:
 a vehicle including:
  a vehicle battery for providing electricity to the vehicle, wherein the vehicle battery includes a plurality of surfaces; and
  a housing for removably receiving the vehicle battery, wherein the housing includes at least the following:
   a hold down bracket that extends along at least one of the plurality of surfaces;
   a first hold down bolt that engages with a portion of the housing and the hold down bracket at a first end of the hold down bracket;
   a second hold down bolt that engages with the portion of the housing and the hold down bracket at a second end of the hold down bracket;
   a first hold down nut that engages with the first hold down bolt to removably secure the vehicle battery to the housing; and
   a second hold down nut that engages with the second hold down bolt to removably secure the vehicle battery to the housing; and
  a locking device for locking to the housing, wherein the locking device includes a first cover plate that extends across at least a portion of the hold down bracket and covers the first hold down nut and the second hold down nut to prevent access to the first hold down nut and the second hold down nut, thereby preventing removal of the vehicle battery when the locking device is engaged, wherein the locking device further comprises a lock that includes a pin component that, when engaged, extends from the lock to engage with the hold down bracket to prevent removal of the locking device from the hold down bracket and when disengaged, retracts towards the lock and from the hold down bracket to allow removal of the locking device from the hold down bracket.

14. The system of claim 13, further comprising an extension bracket for engaging with the locking device.

15. The system of claim 13, wherein the locking device is at least one of the following: substantially L-shaped, substantially U-shaped, substantially curved, substantially square, and substantially rounded.

16. The system of claim 13, wherein the locking device further comprises a second cover plate for securing a different portion of the vehicle battery.

17. The system of claim 13,
wherein the lock is integral to the locking device and disposed on a first end of the locking device; and
wherein the locking device comprises a second lock that is integral to the locking device and disposed on a second end of the locking device.

18. The system of claim 13, further comprising a sheath that is placed over the first hold down bolt.

* * * * *